Feb. 18, 1947.    H. R. C. ANTHONY    2,416,079
DRY BATTERY WRAPPER
Filed June 30, 1943
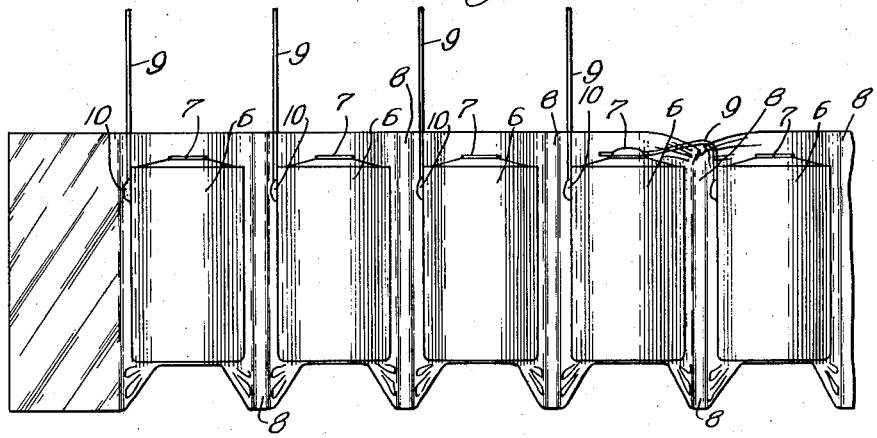
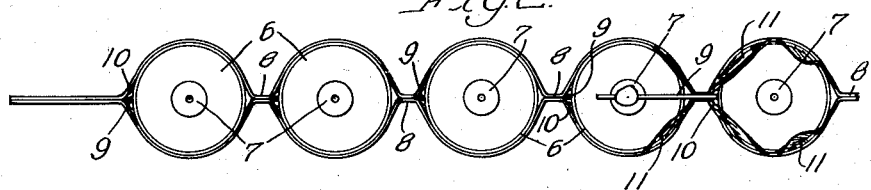
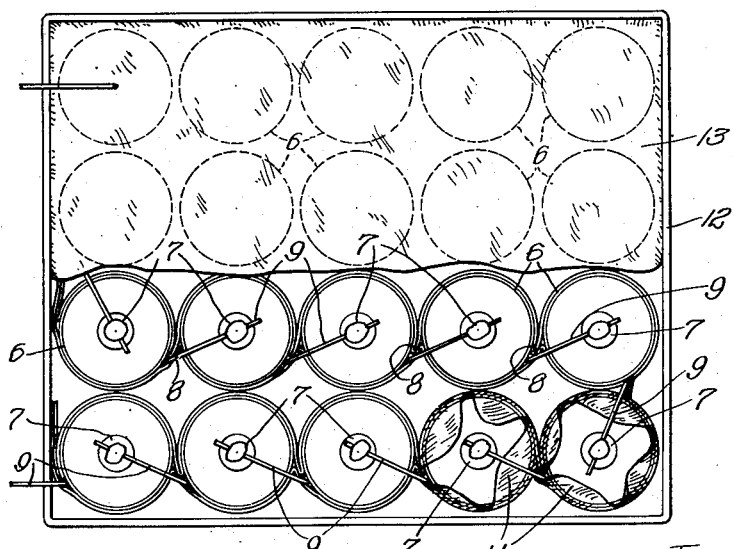
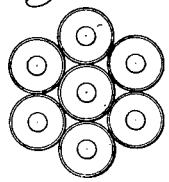
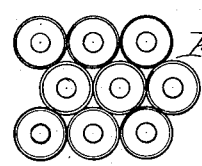

Patented Feb. 18, 1947

2,416,079

UNITED STATES PATENT OFFICE 2,416,079

DRY BATTERY WRAPPER

Herman R. C. Anthony, Madison, Wis., assignor to Ray-O-Vac Company, a corporation of Wisconsin Application June 30, 1943, Serial No. 492,869

3 Claims. (Cl. 136—132)

This invention relates to dry batteries, and more particularly to an improved way of insulating the individual dry cells from each other and arranging them in the form of a belt which can be readily handled and assembled into a complete battery.

The invention is illustrated in a preferred embodiment in the accompanying drawing, in which—

Figure 1 is an elevational view of a group of dry cells contained in a belt of dielectric thermoplastic material; Figure 2 is a top plan view of the same; Figure 3 is a top plan view of a partially completed battery; Figure 4 is a diagrammatic view showing a compact arrangement of dry cells in a circle; and Figure 5 is a diagrammatic view showing another arrangement of cells.

Heretofore in manufacturing dry batteries it has been the usual practice to provide crisscross cardboard partitions, arranged like an egg crate, to provide a separate square cell to receive each dry cell. By the present invention such partitions are not needed, and the over-all dimensions of the finished battery may be substantially reduced. This is particularly desirable in small batteries containing a large number of dry cells, such as hearing aid batteries.

In the embodiment illustrated, a plurality of dry cells having a zinc can 6 and a centrally disposed terminal 7 may be placed on a sheet of thermoplastic material, sold commercially by the Goodyear Tire & Rubber Company under the trade-mark "Pliofilm," and the sheet is turned back over the bottom and sidewalls of the cells and adhered together as indicated at 8 between the cells so as to form separate pockets. Conductor wire 9, soldered to the zinc can, as indicated at 10, may then be bent over and soldered to the terminal 7 of the adjacent cell.

Another suitable material for the belt, sold by Goodyear Tire & Rubber Company, is "Pliofilm V6." When the Pliofilm V6 is subjected to a small amount of heat, the material shrinks and draws tightly around the cell. The top free edges will curl inwardly as indicated at 11, or if sealing wax is poured onto the cell it will bond to it and form a hermetic seal.

As shown in Fig. 3, the belt of cells, connected in series, may then be placed in a suitable container 12, and preferably the cells are covered with a thermoplastic sealing material as indicated at 13.

The belt may be readily handled and the cells brought into very close relationship without danger of short circuits, as the Pliofilm is an excellent insulator. A very compact arrangement for seven dry cells is illustrated diagrammatically in Figure 4. It will also be understood that if the cells are placed in staggered relationship, as indicated in Figure 5, more cells can be placed in a given rectangular area.

In the construction illustrated, it will be seen that each cell is completely enclosed in a tight-fitting pocket, and, should one or more cells be defective or exude electrolyte, the electrolyte will be confined within the pocket and cannot contact and bring about the destruction of an adjacent cell.

The Pliofilm is very thin and flexible, but at the same time has great strength and is not destroyed by the chemicals used in electrolyte. It will be understood that when the belt shown in Figure 1 is placed in a box, any excess Pliofilm material, due to the shape of the cell, will fold over or crush down without causing a perforation in the pocket in the belt. The invention is of particular advantage where a plurality of dry cells are connected in series, making it important that the bodies of the cells be insulated from each other, but the cells may be connected in parallel if desired.

The foregoing detailed description has been given for clearness of understanding only, and no unnecessary limitations should be understood therefrom for some modifications will be obvious to those skilled in the art.

I claim:

1. A dry battery assembly comprising: a plurality of dry cells electrically connected by conductor members, and a sheet of thin, flexible, thermoplastic material folded around the sides and bottom of each cell and heat-sealed on itself between the cells so as to form individual spaced pockets which will prevent electrolyte from leaking from one cell to another, said cell pockets being in juxtaposition and the surplus portions of the thermoplastic sheet between the bottoms of the pockets being folded or crushed into substantially the plane of the bottoms of the cells.

2. A dry battery as specified in claim 1, in which the dry cells have sealing wax top closures which are bonded to the top portions of the pockets of the thermoplastic material.

3. A dry battery as specified in claim 1, in which the top of the assembly is hermetically sealed by wax extending over the ends of the cells and bonded to the thermoplastic sheet.

HERMAN R. C. ANTHONY.

REFERENCES CITED

The following references are of record in the file of this patent:

UNITED STATES PATENTS

| Number | Name | Date |
|---|---|---|
| 395,028 | Bailey et al. | Dec. 25, 1888 |
| 1,925,374 | Deibel | Sept. 5, 1935 |
| 2,042,806 | Schulte | June 2, 1936 |
| 2,289,249 | Deibel | July 7, 1942 |
| 452,250 | Williams | May 12, 1891 |
| 1,277,147 | St. Armande | Aug. 27, 1918 |
| 539,484 | Newton et al. | May 21, 1895 |
| 2,355,197 | Anthony et al. | Aug. 8, 1944 |

OTHER REFERENCES

Simonds et al., "Handbook of Plastics," (1943), pages 395, 409. (Copy in Division 38.)

Leinbach, F. S., "Modern Packaging," May, 1943, page 85. (Copy in Design Division.)